May 31, 1955 J. W. SMITH 2,709,399
MACHINE FOR MAKING PARTITIONED CONTAINERS
Filed Nov. 17, 1952 4 Sheets-Sheet 1
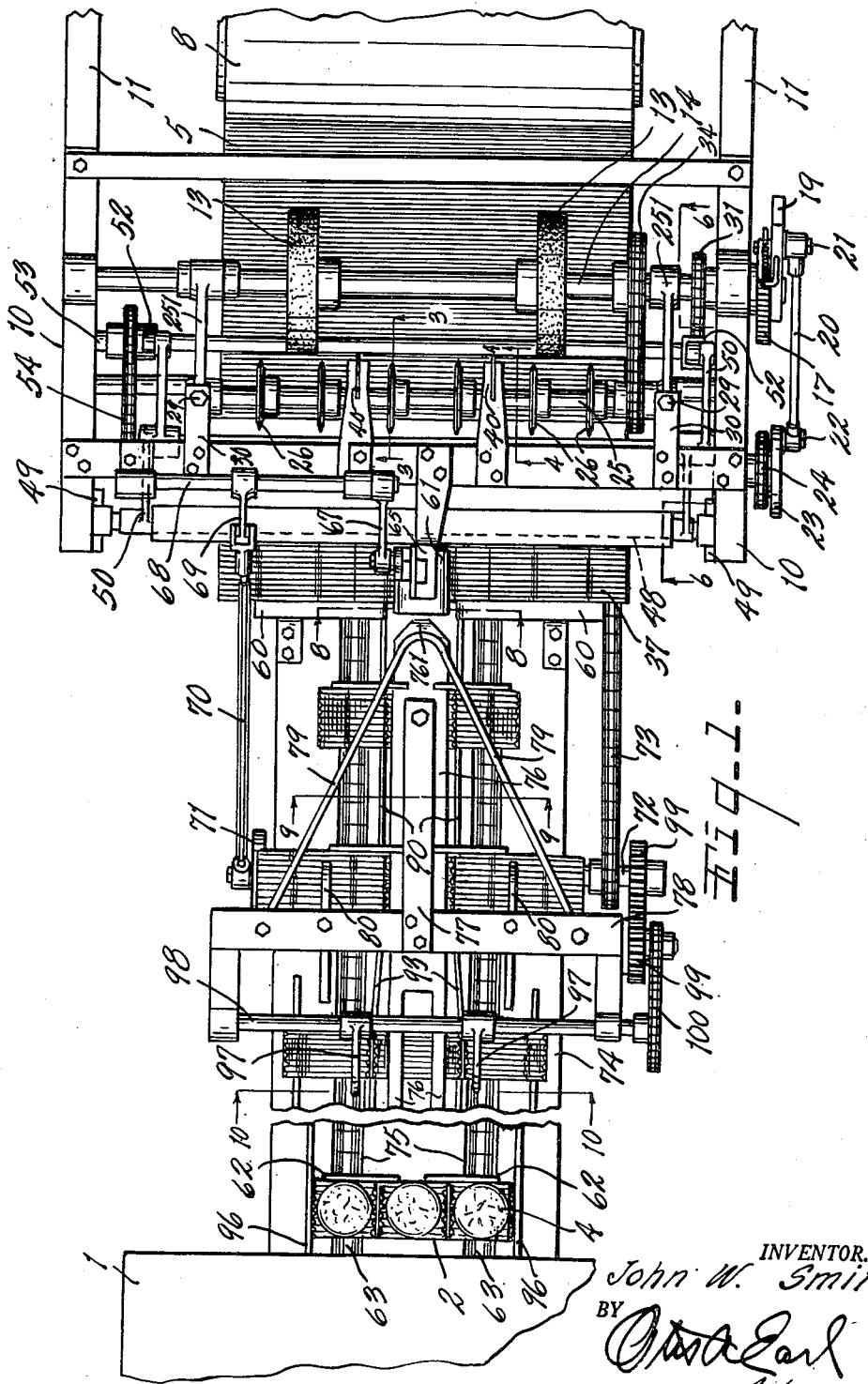
INVENTOR.
John W. Smith
BY
Attorney May 31, 1955  J. W. SMITH  2,709,399
MACHINE FOR MAKING PARTITIONED CONTAINERS
Filed Nov. 17, 1952  4 Sheets-Sheet 2
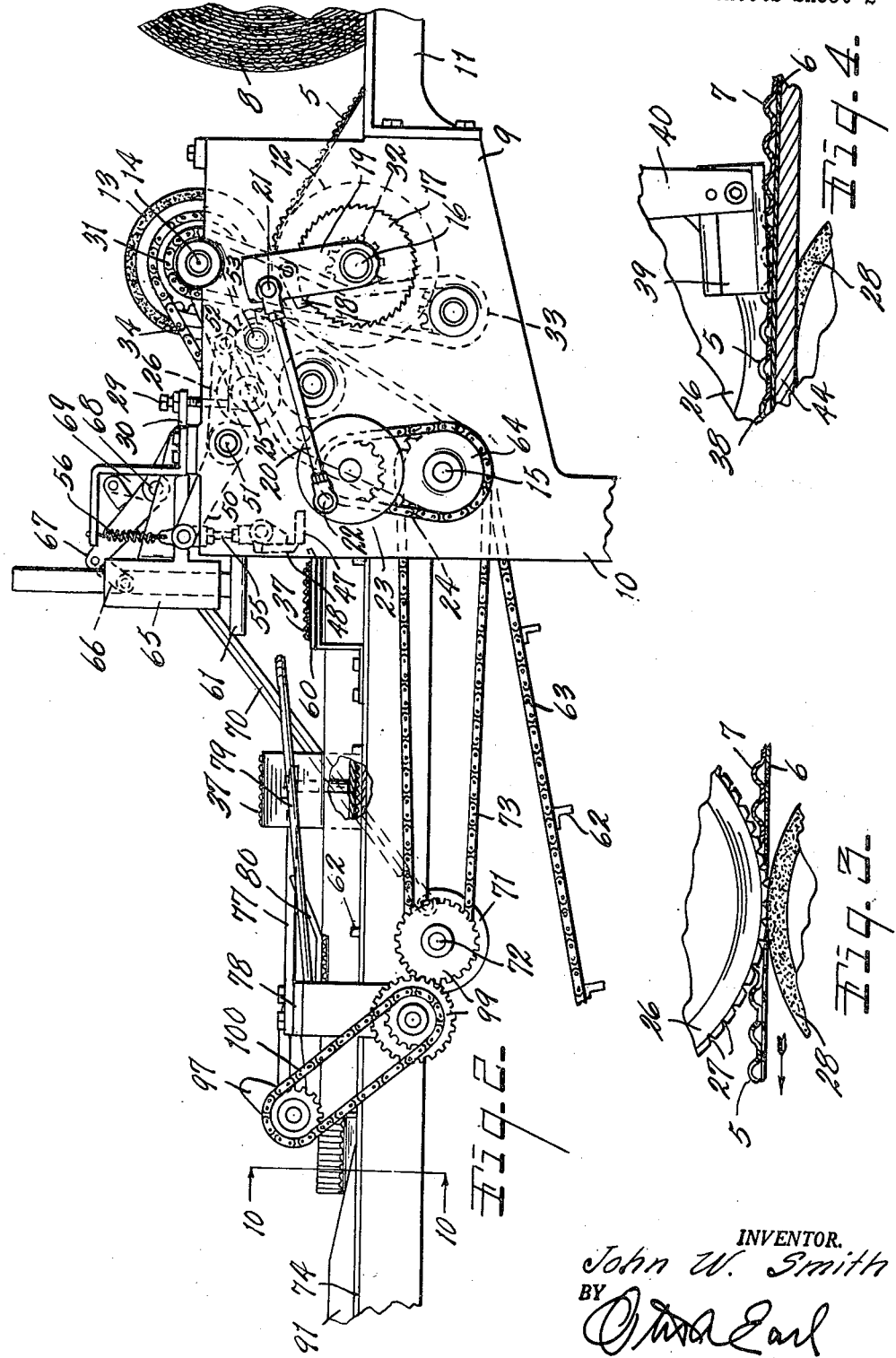
INVENTOR.
John W. Smith
BY
Attorney May 31, 1955  J. W. SMITH  2,709,399
MACHINE FOR MAKING PARTITIONED CONTAINERS
Filed Nov. 17, 1952.  4 Sheets-Sheet 3
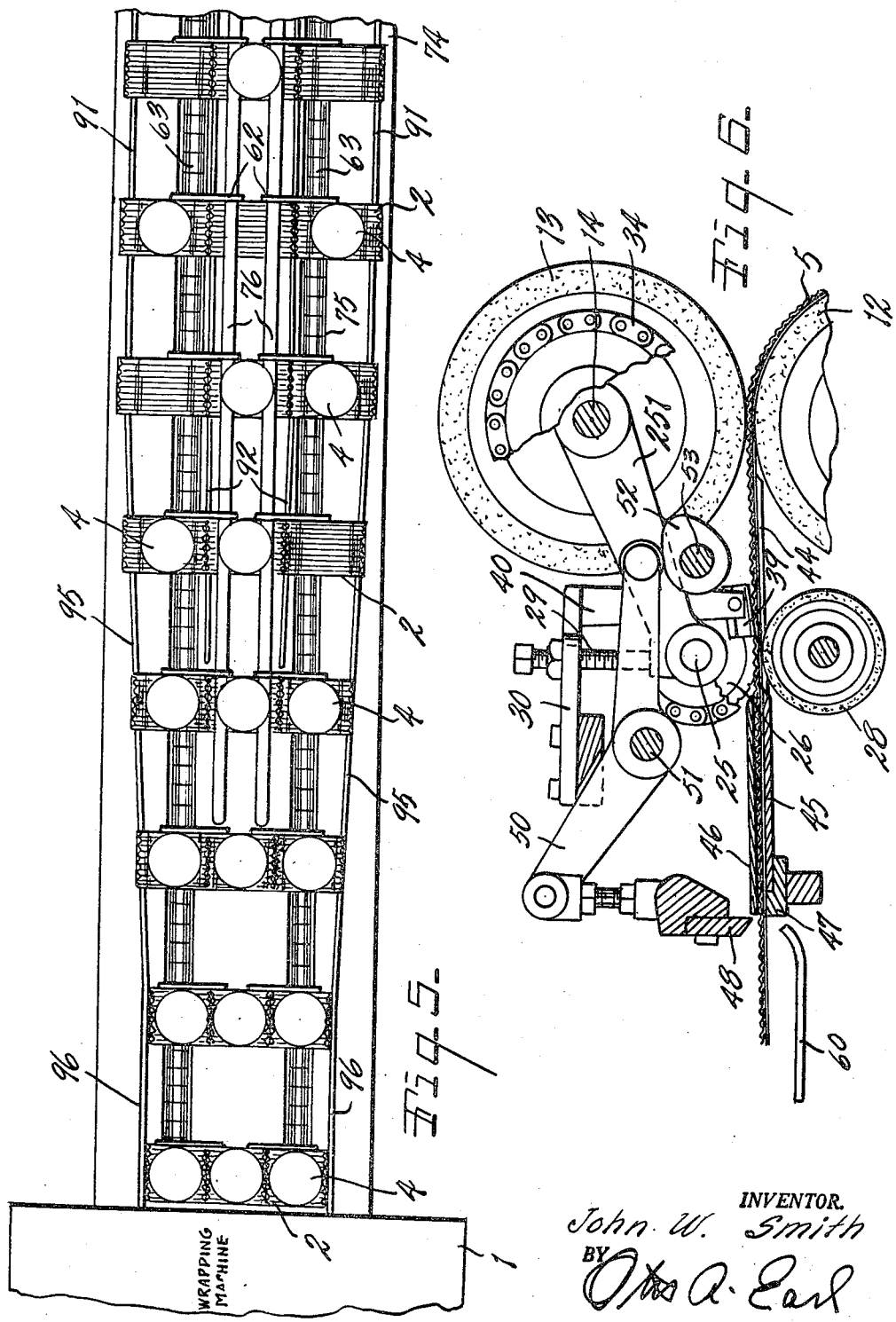
INVENTOR.
John W. Smith
BY
Otto A. Earl
Attorney

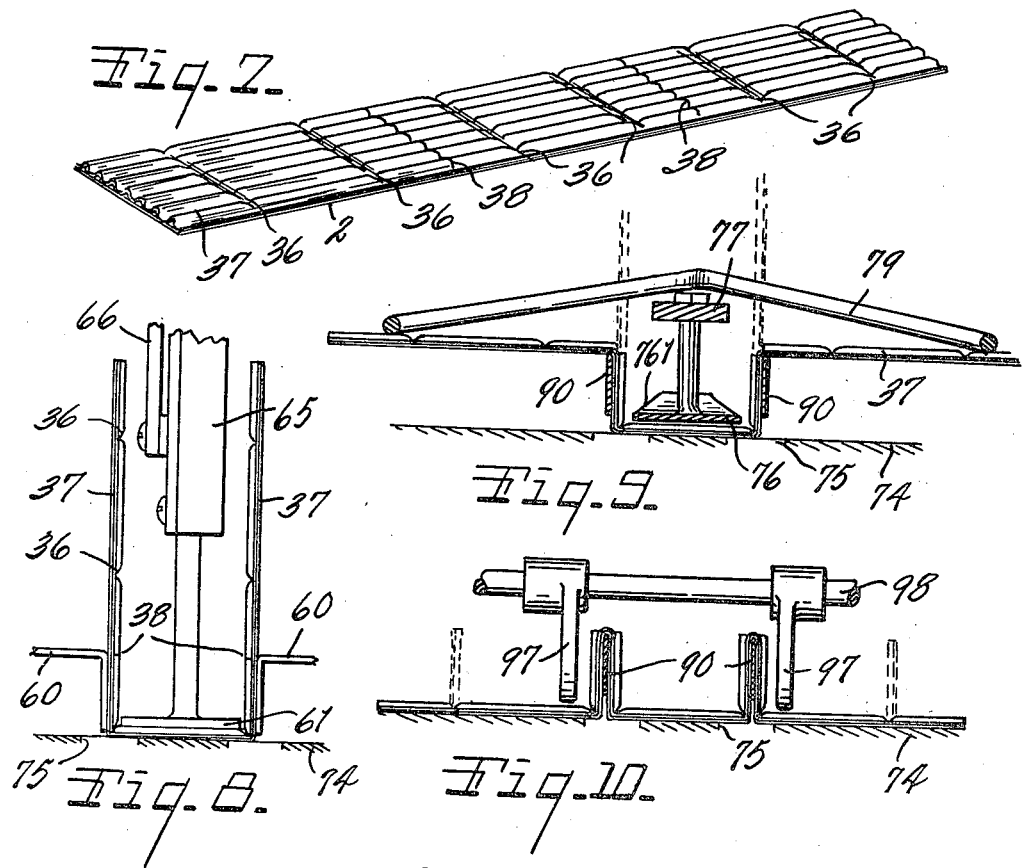
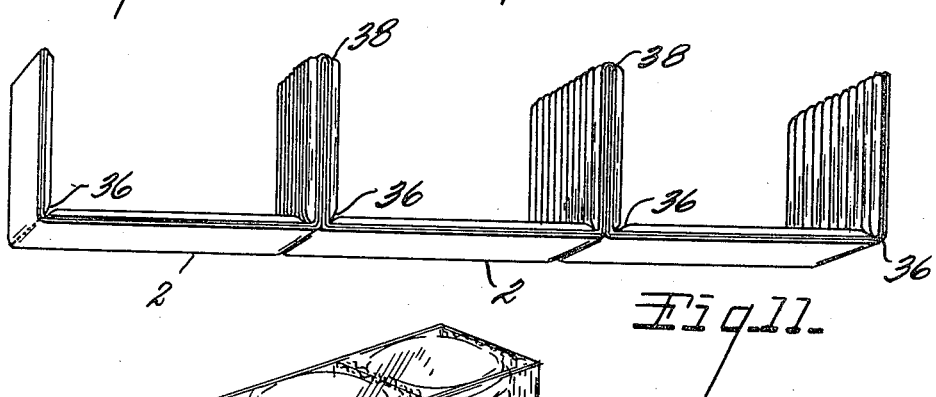
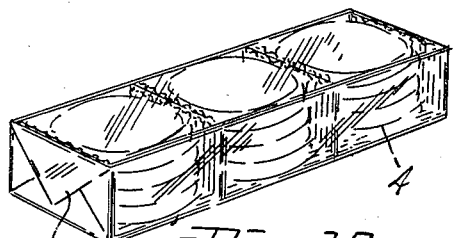

United States Patent Office 2,709,399
Patented May 31, 1955

2,709,399
MACHINE FOR MAKING PARTITIONED CONTAINERS

John W. Smith, Battle Creek, Mich., assignor to Battle Creek Packaging Machines, Inc., a corporation of Michigan Application November 17, 1952, Serial No. 320,863

14 Claims. (Cl. 93—49)

This invention relates to improvements in a machine and method for making partitioned containers.

The main objects of this invention are:

First, to provide a machine for making partitioned containers and facilitating the placing of the contents therein.

Second, to provide a machine for making partitioned containers from multiply stock, the inner ply of which is of corrugated material, for example glassine.

Third, to provide a machine of the class described which is of large capacity and produces a highly attractive container or package.

Fourth, to provide a machine for forming partitioned containers and translating the containers with the walls of the compartments thereof in upwardly diverging relation to facilitate the placing of the packaged contents therein and thereafter while the filled containers are being translated, swinging the walls to their final upright position and delivering the same to a wrapping machine.

Fifth, to provide a method of making and translating partitioned containers facilitating the placing of the contents therein while being translated.

Objects relating to details and economies of the invention will appear from the description to follow. The invention is defined and pointed out in the claims.

A preferred embodiment of the invention is illustrated in the accompanying drawing, in which:

Fig. 1 is a fragmentary plan view of a machine embodying my invention, the wrapping machine being conventionally illustrated.

Fig. 2 is a fragmentary side elevational view of the forward portion of the machine.

Fig. 3 is an enlarged fragmentary view on a line corresponding to line 3—3 of Fig. 1.

Fig. 4 is an enlarged fragmentary view on a line corresponding to line 4—4 of Fig. 1.

Fig. 5 is a fragmentary plan view of a portion of the machine broken away in Fig. 1.

Fig. 6 is an enlarged fragmentary longitudinal section on a line corresponding to line 6—6 of Fig. 1.

Fig. 7 is a top perspective view of the blank produced by the machine.

Fig. 8 is a fragmentary view on a line corresponding to line 8—8 of Fig. 1.

Fig. 9 is an enlarged transverse fragmentary view on a line corresponding to line 9—9 of Fig. 1.

Fig. 10 is an enlarged transverse sectional view on a line corresponding to line 10—10 of Fig. 1.

Fig. 11 is a perspective view of the container in fully erected position.

Fig. 12 is a perspective view of the completed package.

The embodiment of my invention illustrated is designed for the forming of slit and scored blanks from multiply web stock, the inner ply of which is corrugated transversely of the web and being desirably of glassine or like material; the forming of the blanks into upwardly facing multipocketed or compartment containers; the translating of the containers facing upwardly and with the walls diverging upwardly to facilitate the insertion of the material therein such as fragile baked products; and the final positioning of the walls of the pockets and the delivery of the loaded containers to a wrapping machine.

In the accompanying drawing, 1 represents a wrapping machine which is adapted to wrap the container, designated generally by the numeral 2, with a wrapper 3 desirably transparent. The packaged product 4 is illustrated conventionally. The web stock 5 is laminated consisting of an outer ply 6 of paper and a transversely corrugated inner ply 7 desirably of glassine or other grease resistant material. The roll 8 is suitably supported at the front of the machine.

The frame 9 is designed to support the operating parts and comprises end members 10, desirably castings, having forwardly projecting arms 11 therearound for supporting the roll 8. These end members are connected by suitable crosspieces to provide a rigid frame. As the details of the cross members form no part of this invention, they are not described but it will be understood that the end members and other parts of the frame are designed to support the operating mechanism and are provided with suitable required bearings.

The web supporting feed roll 12 is disposed at the rear of the support for the web roll. A pair of soft rubber faced press rolls 13 are disposed above the web supporting and feed roll 12. The rolls 13 are mounted in axially spaced relation on the shaft 14. The driving shaft 15 is drivingly associated with the conveyor as will be hereinafter described. The feed roll 12 is driven with a step by step movement, its shaft 16 being provided with a ratchet wheel 17 with which the pawl 18 on the rocker 19 coacts. The rocker 19 is actuated by the pitman 20 connected at 21 to the rocker and at 22 to the crank disc 23 which is driven from the driving shaft 15 by means of the chain 24 and suitable sprockets.

At the rear of the feed roller is a scoring disc shaft 25 having a plurality of axially spaced scoring discs 26 thereon, these scoring discs being desirably toothed or serrated as shown at 27 (see Fig. 8). A rubber faced supporting roller 28 is arranged in opposed relation to the scoring discs (see Figs. 3 and 4). The shaft 25 is adjustably supported by the arms 251 projecting rearwardly from the shaft 14. Adjusting screws 29 for the shaft 25 are carried by forwardly projecting arms 30 mounted on the frame.

The press roll shaft 14 is driven by the sprocket chain 31 which coacts with the driving sprocket 32 on the shaft 16. The chain 31 is held in driving engagement with the driving sprocket 32 by means of the sprocket 33. This drives the pressure rollers 13 in timed step by step relation with the feed roller 12. The scoring disc shaft 25 is drivingly connected to the shaft 14 by means of the chain 34 and suitable coacting sprockets. The scoring discs are spaced so that they form the scores 36 transversely of the blank 37. These scores, as a result of the use of the toothed discs 26 in the embodiment illustrated, partially sever the stock to facilitate substantially right angled folds thereof with the corrugations on the inner side.

To permit folding in the opposite direction, the corrugated ply is slit at 38, this slitting being accomplished by the knives 39 mounted on the hangers 40 carried by the forwardly projecting arms 41 on the frame. The hangers or the knives are adjustably supported, the details not being illustrated. The knives are rearwardly inclined. In practice, razor blades are found to constitute satisfactory knives or cutters. A supporting plate 44 is disposed in opposed relation to the slitting knives.

The slit and scored stock is delivered across the supporting plate 45, above which is a holddown plate 46 (see Fig. 6), to the shear bar 47. The coacting cutter blade 46 is mounted in vertical guides 49 and is actuated by the levers 50 pivoted at 51 and actuated from the cams 52 on the cam shaft 53. This cam shaft 53 is driven through the sprocket chain 54 and coacting sprockets from the driving shaft 15. The levers 50 are connected by the links 55 to the cutter blade. The springs 56 act to retract the cutter blade and to bias the levers 50 against the cams.

The severed blank 37 is discharged from the cutter upon the first form members 60 as is shown in Figs. 1 and 2. These form members 60 are laterally spaced to receive the vertically reciprocating first folder 61. This first folder when actuated passes between the form members 60 as is illustrated in Fig. 6, forming the first fold and swinging the ends of the blank to an upright position as is shown in that figure and positioning the blank, thus folded, to be engaged by the flights 62 of the conveyor chains 63. These conveyor chains coact with sprockets 64 on the shaft 15 to drive the shaft 15 and thus synchronize the mechanism described with the conveyor mechanism which is synchronized with the wrapping machine.

The folder member 61 is supported in the vertical guide 65 and is connected by the link 66 to the arm 67 on the rockshaft 68. The rockshaft 68 is provided with an arm 69 connected by the pitman or connecting rod 70 to the crank disc 71 on the shaft 72. This shaft is drivingly connected by the chain 73 and suitable sprockets to the driving shaft 15.

The conveyor way 74 extends from the form members 60 to the wrapping machine 1 and has parallel longitudinal slots or openings 75 for the sprocket chains or aligned with the sprocket chains so that the flights 62 of the conveyor chains travel on their rearward reach above the way to translate the container blanks along the way from the first folder through certain successive folders and through the loading zone.

As stated, the first folder positions the blanks to be engaged by the flights. As the blanks are carried rearwardly from the first folder, the bight of the first fold thereof is carried below the elongated longitudinally disposed holddown plate 76 which is supported in vertically spaced relation to the conveyor way, its front end being supported by the arm 77 on the crosspiece 78. The front end of the holddown plate is turned upwardly at 76.

The holddown plate is of a width approximately that of the bight of the first fold of the blank so that the blank is effectively supported as it is translated rearwardly into engagement with the rearwardly diverging spreaders 79 mounted on the crosspiece 78 and project forwardly therefrom with their front ends positioned to pass between the upstanding portions of the blank. These spreaders are rearwardly inclined so that the sides of the blank are gradually turned outward to a substantially horizontal position where they are engaged by the guide members 80. The forward ends of these guide members are upturned so that the blanks readily pass under the same.

To support the first fold and to coact therewith in other manipulations of the blank, elongated inner form members 90 are provided, these extending rearwardly from the first folder throughout a substantial proportion of the conveyor but terminate short of its rear end. A pair of elongated outer form members 91 are provided, these being disposed in laterally spaced relation to the inner form members. It will be noted that the front portions of the inner form members are parallel so that as the blank travels rearwardly from the first folder, the sides of the first fold are held in upright position and supported while the projecting end portions are being turned to the horizontal position shown in Fig. 1. The rear portions 92 of the inner form members are more widely spaced than the front portions and are connected thereto by the integral forwardly converging parts 93. The outer form members 91 have parallel front portions merging into rearwardly converging portions 95 which merge into rear parallel portions 96 which extend to the wrapping machine.

At the rear of the guide members 79 and with the ends of the blanks overlapping the inner and outer pairs of form members, they are engaged by the folders 97 mounted on the shaft 98. This shaft is driven from the shaft 72 to which it is connected by the gears 99 and the chain 100 and suitable coacting sprockets so that the shaft is driven in timed relation to the translation of the blanks by the conveyor. The spacing of the inner and outer form members at the points where the blanks are acted upon by these folders 97 to form the outer compartments is such that the compartment walls diverge upwardly and owing to the diverging of the inner form members at 93, the previously vertical walls of the first fold are spread or diverged outwardly so that the partially erected blank is positioned as is illustrated at the right of Fig. 5. The rear portion of the holddown member 76 is desirably longitudinally slotted to reduce friction on the articles 4 placed thereon.

In the preferred embodiment of my invention, the conveyor is of such length that several workmen may be stationed along the sides thereof to place the product 4 therein. The first operator commonly places the product in the central pocket as indicated in Fig. 5. However, if there should be a miss, as shown in the drawing, it can be loaded by another operator. Other operators place the contents in the pockets to fully load the compartments while their walls diverge upwardly which greatly facilitates the loading operation. When the compartments are fully loaded, the walls of the compartments or pockets are swung to fully or finally erected position as the loaded containers pass between the parallel portions 96 of the outer form members.

It will be noted that the inner form members terminate in substantially spaced relation to the rear end of the conveyor so that the closing or finally erecting movement can take place substantially in advance of the rear end of the conveyor. The conveyor delivers the loaded containers to the wrapping machine by which they are wrapped as illustrated in Fig. 12. It will be observed that no hand manipulation of the containers is required and the loading thereof is greatly facilitated as they are translated.

I have illustrated and described my invention as particularly designed for the handling of baked goods. It will be realized, however, that various products may be rapidly and economically packaged. I have not attempted to illustrate or describe other embodiments or adaptations as it is believed that this disclosure will enable those skilled in the art to embody or adapt the invention as may be desired.

Having thus described my invention, what I claim as new and desire to secure by Letters Patent is:

1. In combination with means for feeding a web of multiply stock step by step, the inner ply being corrugated transversely of the web, means for scoring the web longitudinally and longitudinally slitting the corrugated ply intermediate certain of the scores, a cutter actuated in timed relation to said feed means for severing holder blanks from the advancing end of the scored and slit stock, a conveyor comprising a way and conveying flights translated longitudinally of the way, a first folder disposed above the front end of the conveyor and comprising a pair of laterally spaced form members to which the severed blanks are delivered from said cutter, and a vertically reciprocating plunger reciprocating between said form members to form a central first fold in the blank with end portions thereof projecting upwardly and to position it to be engaged by a conveyor flight, an elongated holddown member of a width approximating that of the bight portion of the first fold disposed longitudinally of and in vertically spaced relation to the conveyor to receive the bight portion of the first fold of the blank, said holddown member terminating in forwardly spaced relation to the rear end of the conveyor, elongated laterally spaced inner form members extending rearwardly from said first folder and disposed to embrace the first fold thereof while the bight portion thereof is engaged with said holddown member, rearwardly diverging rearwardly inclined spreaders disposed at the rear of the first folder to turn the portions of the blank projecting above said inner form members outwardly, elongated outer form members spaced laterally outward relative to said inner form members and having substantially parallel front and rear portions and rearwardly converging intermediate portions merging therewith, said inner form members having substantially parallel front portions followed by more widely spaced portions which convergingly merge into said front portions, said inner form members terminating at their rear ends in spaced relation to the rear ends of the outer form members, horizontally disposed guide members acting to guide the end portions of the blank at the sides of said first fold into overlapping relation to said inner and outer form members, and laterally spaced folders positioned to act upon the blanks while so positioned to fold portions thereof downwardly between adjacent inner and outer form members, the inner and outer form members at such folding point being spaced so that the walls of the pockets diverge upwardly facilitating the placement of material thereon, the converging portions of the form members acting to swing the walls to an upright position as the blanks are translated during the rear portion of the translating movement of the blanks by the conveyor.

2. In combination with means for feeding a web of multiply stock step by step, the inner ply being corrugated transversely of the web, means for scoring the web longitudinally and longitudinally slitting the corrugated ply intermediate certain of the scores, a cutter actuated in timed relation to said feed means for severing holder blanks from the advancing end of the scored and slit stock, a conveyor comprising a way and conveying flights translated longitudinally of the way, a first folder disposed above the front end of the conveyor and comprising a pair of laterally spaced form members to which the severed blanks are delivered from said cutter, and a folder member reciprocating between said form members to form a central first fold in the blank with end portions thereof projecting upwardly and to position it to be engaged by a conveyor flight, an elongated holddown member of a width approximating that of the bight portion of the first fold disposed longitudinally of and in vertically spaced relation to the conveyor to receive the bight portion of the first fold of the blank, elongated laterally spaced inner form members extending rearwardly from said first folder and disposed to embrace the first fold thereof while the bight portion thereof is engaged with said holddown member, spreaders disposed at the rear of the first folder to turn the portions of the blank projecting above said inner form members outwardly, elongated outer form members spaced laterally outward relative to said inner form members and having substantially parallel front and rear portions and rearwardly converging intermediate portions merging therewith, said inner form members having substantially parallel front portions followed by more widely spaced portions which convergingly merge into said front portions, guide members acting to guide the end portions of the blank at the sides of said first fold into overlapping relation to said inner and outer form members, and laterally spaced folders positioned to act upon the blanks while so positioned to fold portions thereof downwardly between adjacent inner and outer form members, the inner and outer form members at such folding point being spaced so that the walls of the pockets diverge upwardly facilitating the placement of material thereon, the converging portions of the form members acting to swing the walls to an upright position as the blanks are translated during the rear portion of the translating movement of the blanks by the conveyor.

3. In combination with means for feeding a web of multiply stock step by step, the inner ply being corrugated transversely of the web, means for scoring the web longitudinally and longitudinally slitting the corrugated ply intermediate certain of the scores, a cutter actuated in timed relation to said feed means for severing holder blanks from the advancing end of the scored and slit stock, a conveyor comprising a way and conveying flights translated longitudinally of the way, a first folder disposed above the front end of the conveyor and comprising a pair of laterally spaced form members to which the severed blanks are delivered from said cutter, and a folder member reciprocating between said form members to form a central first fold in the blank with end portions thereof projecting upwardly and to position it to be engaged by a conveyor flight, an elongated holddown member of a width approximating that of the bight portion of the first fold disposed longitudinally of and in vertically spaced relation to the conveyor to receive the bight portion of the first fold of the blank, elongated laterally spaced inner form members extending rearwardly from said first folder and disposed to embrace the first fold thereof while the bight portion thereof is engaged with said holddown member, spreaders disposed at the rear of the first folder to turn the portions of the blank projecting above said inner form members outwardly, elongated outer form members spaced laterally outward relative to said inner form members, guide members acting to guide the end portions of the blank at the sides of said first fold into overlapping relation to said inner and outer form members, and laterally spaced folders positioned to act upon the blanks while so positioned to fold portions thereof downwardly between adjacent inner and outer form members.

4. In combination with a conveyor comprising a way and conveyor flights translated longitudinally of the way, a first folder disposed above the conveyor and comprising a pair of laterally spaced form members adapted to support container blanks foldable on predetermined lines, and a coacting folder member reciprocating between said form members to form a central first fold in the blank with end portions thereof projecting upwardly and to position the blank to be engaged by a conveyor flight, an elongated holddown member disposed longitudinally of and in vertically spaced relation to the conveyor to receive the bight portion of the first fold of the blank, said holddown member terminating in forwardly spaced relation to the rear end of the conveyor, elongated laterally spaced inner form members disposed to embrace the first fold of the blank while the bight portion thereof is engaged with said holddown member, elongated outer form members spaced laterally outward relative to said inner form member and having substantially parallel front and rear portions and rearwardly converging intermediate portions merging therewith, said inner form members having substantially parallel front portions followed by more widely spaced portions which merge into said front portions, means for positioning the portions of the blank at the sides of said first fold in overlapping relation to said inner and outer form members, and folders positioned to act upon the blank while so positioned to fold portions thereof downwardly between adjacent inner and outer form members, the inner and outer form members at such folding point being spaced so that the walls of the pockets diverge upwardly facilitating the placement of material thereon, the converging portions of the form members acting to swing the walls to an upright position as the blanks are translated at the rear portion of the translating movement of the blanks by the conveyor.

5. In combination with a conveyor comprising a way and conveyor flights translated longitudinally of the way, a first folder disposed above the conveyor and comprising a pair of laterally spaced form members adapted to support container blanks foldable on predetermined lines, and a coacting folder member reciprocating between said form members to form a central first fold in the blank with end portions thereof projecting upwardly and to position the blank to be engaged by a conveyor flight, an elongated holddown member disposed longitudinally of and in vertically spaced relation to the conveyor to receive the bight portion of the first fold of the blank, elongated laterally spaced inner form members disposed to embrace the first fold of the blank while the bight portion thereof is engaged with said holddown member, elongated outer form members spaced laterally outward relative to said inner form members and having substantially parallel front and rear portions and rearwardly converging intermediate portions merging therewith, said inner form members having substantially parallel front portions followed by more widely spaced portions which merge into said front portions, means for positioning the portions of the blank at the sides of said first fold in overlapping relation to said inner and outer form members, and folders positioned to act upon the blank while so positioned to fold portions thereof downwardly between adjacent inner and outer form members, the inner and outer form members at such folding point being spaced so that the walls of the pockets diverge upwardly facilitating the placement of material thereon, the converging portions of the form members acting to swing the walls to an upright position as the blanks are translated at the rear portion of the translating movement of the blanks by the conveyor.

6. In combination with a conveyor comprising a way and conveyor flights translated longitudinally of the way, a first folder disposed above the conveyor and comprising a pair of laterally spaced form members adapted to support container blanks foldable on predetermined lines, and a coacting folder member reciprocating between said form members to form a central first fold in the blank with end portions thereof projecting upwardly and to position the blank to be engaged by a conveyor flight, an elongated holddown member disposed longitudinally of and in vertically spaced relation to the conveyor to receive the bight portion of the first fold of the blank, said holddown member terminating in forwardly spaced relation to the rear end of the conveyor, elongated laterally spaced inner form members disposed to embrace the first fold of the blank while the bight portion thereof is engaged with said holddown member, elongated outer form members spaced laterally outward relative to said inner form members, means for positioning the portions of the blank at the sides of said first fold in overlapping relation to said inner and outer form members, and folders positioned to act upon the blank while so positioned to fold portions thereof downwardly between adjacent inner and outer form members.

7. In combination with a conveyor comprising a way and conveyor flights translated longitudinally of the way, a first folder disposed above the conveyor and comprising a pair of laterally spaced form members adapted to support container blanks foldable on predetermined lines, and a coacting folder member reciprocating between said form members to form a central first fold in the blank with end portions thereof projecting upwardly and to position the blank to be engaged by a conveyor flight, an elongated holddown member disposed longitudinally of and in vertically spaced relation to the conveyor to receive the bight portion of the first fold of the blank, elongated laterally spaced inner form members disposed to embrace the first fold of the blank while the bight portion thereof is engaged with said holddown member, elongated outer form members spaced laterally outward relative to said inner form members, means for positioning the portions of the blank at the sides of said first fold in overlapping relation to said inner and outer form members, and folders positioned to act upon the blank while so positioned to fold portions thereof downwardly between adjacent inner and outer form members.

8. The combination with a conveyor, of a first folder for container blanks foldable on predetermined lines acting to form a central first fold in the blank with end portions thereof projecting upwardly, an elongated holddown member disposed longitudinally of and in vertically spaced relation to the conveyor to receive the bight portion of the first fold of the blank, elongated laterally spaced inner form members disposed to embrace the first fold of the blank while the bight portion thereof is engaged with said holddown member, elongated outer form members spaced laterally outward relative to said inner form members and having substantially parallel front and rear portions and rearwardly converging intermediate portions merging therewith, said inner form members having substantially parallel front portions followed by more widely spaced portions which merge into said front portions, means for positioning the portions of the blank at the sides of said first fold in overlapping relation to said inner and outer form members, and laterally spaced folders positioned to act upon the blank while so positioned to fold portions thereof downwardly between adjacent inner and outer form members, the inner and outer form members at such folding point being spaced so that the walls of the pockets diverge upwardly facilitating the placement of material thereon, the converging portions of the form members acting to swing the walls to an upright position as the blanks are translated at the rear portion of the translating movement of the blanks by the conveyor.

9. The combination with a conveyor, of a first folder for container blanks foldable on predetermined lines acting to form a central first fold in the blank with end portions thereof projecting upwardly, an elongated holddown member disposed longitudinally of and in vertically spaced relation to the conveyor to receive the bight portion of the first fold of the blank, elongated laterally spaced inner form members disposed to embrace the first fold of the blank while the bight portion thereof is engaged with said holddown member, elongated outer form members spaced laterally outward relative to said inner form members, means for positioning the portions of the blank at the sides of said first fold in overlapping relation to said inner and outer form members, and laterally spaced folders positioned to act upon the blank while so positioned to fold portions thereof downwardly between adjacent inner and outer form members.

10. In a machine for forming containers having a plurality of pockets from web stock including an inner ply corrugated transversely of the web, the combination with a conveyor way and translating flights associated therewith, means for feeding the web step by step, a driven scoring disc shaft to which the web is advanced by said feed means provided with a plurality of axially spaced serrated scoring discs, a web supported roller disposed in opposed relation to said scoring disc, slitting knives for the corrugated ply disposed in laterally spaced relation to certain of said scoring discs, a cutter for severing container blanks from the scored and slit stock, a first folder positioned to receive the blanks from the cutter and acting to position the blanks with the first fold thereof to be engaged by a conveyor flight, means at the rear of the first folder for forming folds in the blank at the sides of the folds in upwardly diverging relation and supporting them in that relation as they are translated along the conveyor to facilitate the placing of articles to be packaged therein, and means at the rear end of the conveyor for swinging the walls of the compartments to fully erected position prior to the discharge of the containers from the conveyor.

11. In a machine for forming containers having a plurality of pockets from web stock including an inner ply corrugated transversely of the web, the combination with a conveyor way and translating flights associated therewith, means for feeding the web step by step, a driven scoring disc shaft to which the web is advanced by said feed means provided with a plurality of axially spaced serrated scoring discs, a web supported roller disposed in opposed relation to said scoring disc, slitting knives for the corrugated ply disposed in laterally spaced relation to certain of said scoring discs, a cutter for severing container blanks from the scored and slit stock, a first folder positioned to receive the blanks from the cutter and acting to position the blanks with the first fold thereof to be engaged by a conveyor flight, means at the rear of the first folder for forming folds in the blank at the sides of the folds.

12. In combination with a conveyor comprising a way and spaced conveyor flights translated longitudinally of the way, a first folder disposed above the conveyor and comprising a pair of laterally spaced form members adapted to support container blanks foldable on predetermined lines, and a coacting folder member reciprocating between said form member to form a central first fold in the blank with end portions thereof projecting upwardly and to position the blank to be engaged by a conveyor flight, an elongated holddown member disposed longitudinally of and in vertically spaced relation to the conveyor to receive the bight portion of the first fold of the blank, elongated laterally spaced inner form members disposed to embrace the first fold while the bight portion thereof is engaged with said holddown member, elongated outer form members spaced laterally outward relative to said inner form members, said inner form members terminating at their rear ends in spaced relation to the rear ends of the outer form members, means acting to position the end portions of the blank at the sides of said first fold in overlapping relation to said inner and outer form members, and folders positioned to act upon the blank so positioned to fold the end portions thereof downwardly between adjacent inner and outer form members, said inner and outer form members acting to maintain the folds to provide upwardly facing pockets in which the articles to be packaged may be placed as the containers are translated along the conveyor.

13. In a machine for erecting blanks foldable on predetermined lines to provide a plurality of compartments including a conveyor which constitutes the feed conveyor of a wrapping machine, the conveyor comprising a way along which the containers are translated in spaced relation of a first folder for folding the container blank to provide a central first fold positioned to be engaged by the conveyor, an elongated holddown member disposed longitudinally of the conveyor to receive the bight portion of the first fold of the blank, elongated laterally spaced inner form members disposed to embrace the first fold of the blank while the bight portion thereof is engaged with said holddown member, elongated outer form members spaced laterally outward relative to the inner form members, means acting to position the end portion of the blank at the sides of the first fold in overlapping relation to said inner and outer form members, and folders positioned to act upon the blanks so positioned to fold the end portion thereof downwardly between adjacent inner and outer form members, the inner and outer form members being spaced at such a point so that the walls of the upwardly facing compartments diverge to facilitate the placing of articles therein, said outer form members having parallel portions at the rear end thereof spaced to swing the container compartment walls to fully erected positions with the contents therein as the containers are translated by the conveyor.

14. In a machine for erecting blanks foldable on predetermined lines to provide a plurality of compartments including a conveyor which constitutes the feed conveyor of a wrapping machine, the conveyor comprising a way along which the containers are translated in spaced relation of a first folder for folding the container blank to provide a central first fold positioned to be engaged by the conveyor, an elongated holddown member disposed longitudinally of the conveyor to receive the bight portion of the first fold of the blank, elongated laterally spaced inner form members disposed to embrace the first fold of the blank while the bight portion thereof is engaged with said holddown member, elongated outer form members spaced laterally outward relative to the inner form members, means acting to position the end portion of the blank at the sides of the first fold in overlapping relation to said inner and outer form members, and folders positioned to act upon the blanks so positioned to fold the end portion thereof downwardly between adjacent inner and outer form members.

References Cited in the file of this patent

UNITED STATES PATENTS

| Number | Name | Date |
| --- | --- | --- |
| 276,297 | Smyth | Apr. 24, 1883 |
| 369,944 | Jaeger | Sept. 13, 1887 |
| 982,744 | Purchas et al. | Jan. 24, 1911 |
| 1,067,253 | Inman | July 15, 1913 |
| 1,293,288 | Wright et al. | Feb. 4, 1919 |
| 1,645,135 | Goldberg et al. | Oct. 11, 1927 |
| 2,384,494 | Shutter | Sept. 11, 1945 |
| 2,503,874 | Ives | Apr. 11, 1950 |
| 2,616,233 | Schenk | Nov. 4, 1952 |

FOREIGN PATENTS

| Number | Country | Date |
| --- | --- | --- |
| 454,887 | Germany | Dec. 29, 1927 |